United States Patent [19]

Michishita et al.

[11] Patent Number: 4,484,053
[45] Date of Patent: Nov. 20, 1984

[54] DEVICE FOR ELECTRICAL DISCHARGE MACHINING OF A WORK IN THE FORM OF A ROLL

[75] Inventors: Katsumi Michishita; Mitsugi Kawano, both of Fukuyama; Fujio Aoshima, Nagoya; Yukio Kato, Kani; Tetsuhiro Asamoto, Nagoya, all of Japan

[73] Assignees: Mitsubishi Denki Kabushiki Kaisha; Nippon Kokan Kabushiki Kaisha, both of Tokyo, Japan

[21] Appl. No.: 423,741

[22] Filed: Sep. 27, 1982

[30] Foreign Application Priority Data

Sep. 30, 1981 [JP] Japan .................. 56-156001

[51] Int. Cl.³ .............................................. B23P 1/02
[52] U.S. Cl. ................................ 219/69 E; 219/69 V
[58] Field of Search ............... 219/69 R, 69 E, 69 M, 219/69 V; 204/129.7

[56] References Cited

U.S. PATENT DOCUMENTS

| | | | |
|---|---|---|---|
| 3,740,519 | 6/1973 | O'Connor | 219/69 E |
| 4,219,718 | 8/1980 | Sato et al. | 219/69 |
| 4,221,952 | 9/1980 | Sato et al. | 219/69 |
| 4,230,927 | 10/1980 | Sato et al. | 219/69 |
| 4,233,485 | 11/1980 | Sato et al. | 219/69 |
| 4,242,557 | 12/1980 | Sato et al. | 219/69 |
| 4,247,748 | 1/1981 | Sato et al. | 219/69 |
| 4,287,403 | 9/1981 | Sato et al. | 219/69 |

FOREIGN PATENT DOCUMENTS

| | | | |
|---|---|---|---|
| 228357 | 7/1963 | Austria | 219/69 E |
| 54-25595 | 2/1979 | Japan | 219/69 E |
| 55-150923 | 11/1980 | Japan | 219/69 E |
| 787732 | 12/1957 | United Kingdom | 219/69 E |

Primary Examiner—Roy N. Envall, Jr.
Assistant Examiner—Geoffrey S. Evans
Attorney, Agent, or Firm—Fleit, Jacobson, Cohn & Price

[57] ABSTRACT

There is disclosed a device for electrical discharge machining of a work in the form of a roll for providing a satinized indented surface by satinizing operation to a predetermined surface roughness, wherein two rows of heads each mounting one or more electrodes are mounted on either sides of the rotary axis of the roll for increasing the number of heads and thereby reducing the working time. One of the rows of heads is movably mounted on a shaft on the side of roll handling operation of the roll for transiently displacing the heads in their entirety to an out-of-the-way position for solving the problem caused by roll handling and by the increase in the number of heads.

8 Claims, 2 Drawing Figures

DEVICE FOR ELECTRICAL DISCHARGE MACHINING OF A WORK IN THE FORM OF A ROLL

BACKGROUND OF THE INVENTION

This invention relates to a device for electrical discharge machining wherein the work surface is etched by electrical discharge machining to a predetermined surface roughness for providing the satinized indented surface on the work.

Heretofore, in providing a satin finish to a roll used for rolling a steel skelp, especially to a cold working roll, hard metal particles known as shots or grits are projected onto a ground roll surface for providing indented marks on the roll surface. In recent years, this type of machining is tentatively performed by an electrical discharge machining. The electrical discharge machining as used in this method consists essentially in providing an insulating liquid such as kerosene in the narrow discharge gap between the electrode and the work surface and a pulsed voltage is applied across the electrode and the work to cause an electrical discharge for thereby etching or machining the work surface. Such discharge is caused to occur repeatedly between the work in the form of a roll (hereafter abbreviated occasionally to roll) and said electrode while the roll is rotated about its own axis and moved longitudinally along the rotary axis of the roll for providing a satin finish on the roll surface consisting of spirally extending continuous discharge marks. This is the method for providing a uniform satin finish on the roll surface by utilizing an electrical discharge machining. The satinized roll surface thus obtained has many advantages over that obtained through projection of metal particles in that the indents are more accentuated and trim in shape while not being affected by the degree of hardness or the manufacture process of the roll, and in that the metal structure at or near the roll surface may be improved in toughness due to electrical discharge and thus may be most convenient for a roll used in the roll working.

According to the conventional practice for such electrical discharge dull machining, multi-head and multi-divided electrodes are used with a view to reducing the working time. However, a certain limit is imposed on the number of electrode segments obtained by such division of the electrode and there is moreover an inconvenience that the working time may be prolonged over that required in the conventional process in the region of low surface roughness on account of certain characteristics of electrical discharge machining.

In order to solve this problem, it is basically necessary to increase the number of the heads and the number of the working electrodes. So far, this has not been feasible because of the structural constraint inherent to the electric discharge machining device.

SUMMARY OF THE INVENTION

In view of the foregoing, the present invention contemplates to provide an electrical discharge machining device comprising a pair of rows of electrode holders or heads on both sides of a rotational axis of the roll for increasing the number of heads and thereby shortening the working or machining time, and means for displacing the heads on the roll handling side in their entirety during roll handling for solving the inconvenience in roll handling, such as transport of the roll into and out of the machining position.

Briefly, the present invention resides in a device for electrical discharge machining of a work in the form of a roll comprising a rotary shaft for supporting and rotating the work, a first row of electrodes mounted opposite to said roll and on one side of said rotary shaft, first means for holding said first row of electrodes and moving it axially of said shaft, a first pulse source for supplying pulsed voltage across said first row of electrodes and said rolls, a second row of electrodes mounted opposite to said roll and on the other side of said shaft, second means for holding said second row of electrodes and moving it axially of said shaft to a position that does not obstruct the roll handling operation, and a second pulse source for supplying pulsed voltage across said second row of electrodes and said roll.

In the above construction of the present invention, the first and second rows of electrodes are mounted on both sides of the rotary axis of the roll opposite to each other for increasing the number of the electrodes and thereby reducing the working time. Since the second means is capable of displacing the roll-handling side heads and the second row of electrodes mounted thereto to a position that does not obstruct the roll handling operation, the problem involved in roll handling that may arise with the increase in the number of rolls may be solved.

Other and further objects, features and advantages of the invention will be more fully apparent form the following description.

DESCRIPTION OF A PREFERRED EMBODIMENT

Figure 1:
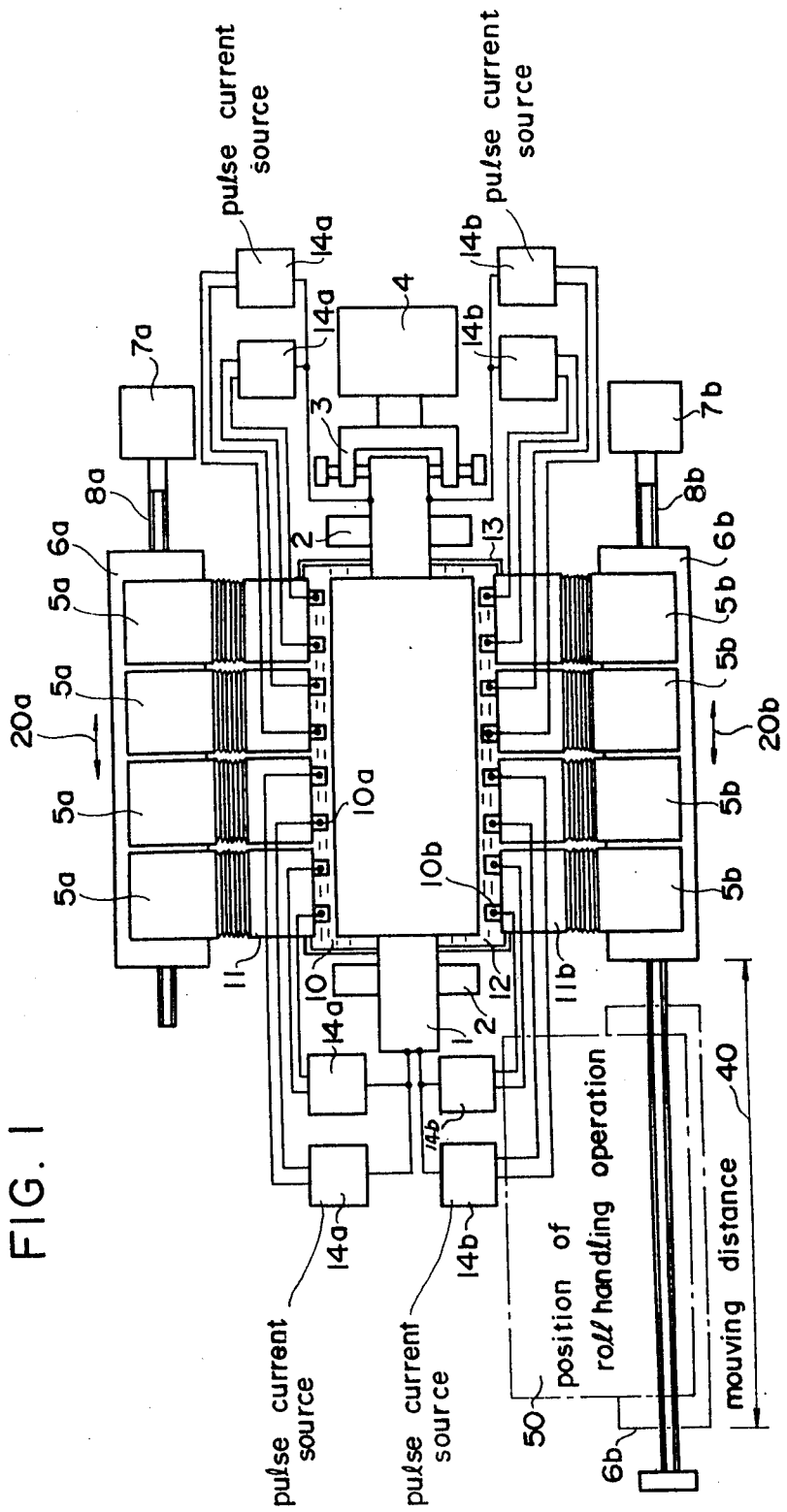
FIG. 1 is a diagrammatic view showing an electrical discharge machining device according to a preferred embodiment of the present invention.
Figure 2:
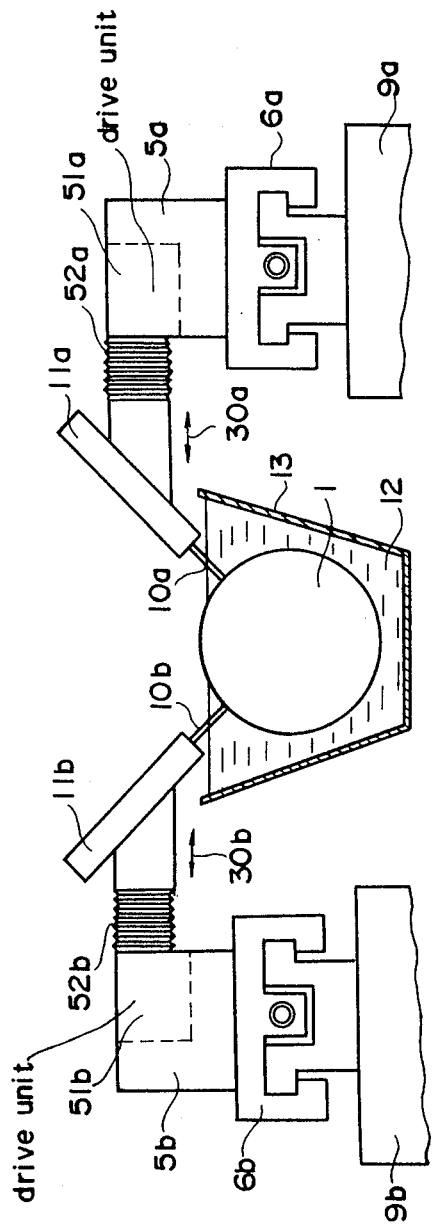
FIG. 2 is a diagrammatic side elevational view of the device shown in FIG. 1.

As shown in FIGS. 1 and 2, a work or roll 1 is mounted horizontally by a pair of bearings 2, 2. The roll 1 has its end portions chucked by dogs 3 and rotated at a constant speed by a roll driving unit 4. Plural heads 5a are secured to a base block 6a on one side of a rotary axis of the roll 1 and movable parallel to said rotary axis as shown by the arrow mark 20a on the sliding surface of the bed 9a at a constant speed by a lead screw 8a which is rotated by a head longitudinal feed unit 7a. Similarly, plural heads 5b are secured on a base block 6b at the other side of the roll axis and movable parallel to the roll axis as shown by the arrow mark 20b and on the slide surface of the bed 9b at a constant speed by means of a head longitudinal feed drive unit 7b and a lead screw 8b. Plural electrodes 10a are mounted at a constant pitch on each electrode holder 11a mounted on the head 5a. Similarly, plural heads 10b are mounted at a constant pitch on each electrode holder 11b mounted on the head 5b. The electrodes 10a, 10b are separated from and insulated with respect to one another for providing multi-divided electrodes, and are mounted opposite to each other over substantially the axial length of the roll 1.

A liquid tank 13 is mounted on the beds 9a, 9b and supplied with a working liquid 12 by a pump, not shown. Discharge energy is supplied to electrodes 10a, 10b mounted respectively to electrode holders 11a, 11b of the heads 5a, 5b from pulse current sources 14a, 14b each associated with one of the head 5a, 5b. When the positive feeder is connected to the electrode 10b, the negative feeder is connected to the roll 1 and vice versa.

Servo feed of the electrodes 10a, 10b is effected separately at each head 5a, 5b and by moving arms 52a, 52b in the direction of the arrow marks 30a, 30b by the operation of drive units 51a, 51b enclosed in the head 5a, 5b, respectively. By means of this servo system, an increased number of heads such as 5a, 5b may be mounted with good structural adaptability. The servo system is not limited to the above construction, but may be so designed as to control the operation of each electrode or electrode holder if so desired.

In case of providing a pair of discharge units on either sides of the roll axis so that one row of the heads is arranged on the roll handling side, roll handling operation such as transporting the roll into and out of the machining positions may likely be a matter of great difficulties.

According to the present invention, for solving this problem, the lead screw 8b, that is, the operating shaft of a displacement device, has a length substantially twice as long as that of the roll 1 for enlarging the stroke of the base block 6b mounting the roll handling side heads 5b. When the rolls are carried into or out of the operating positions, the base block 6b are moved by a distance 40 to a position shown at chain-dotted line 50 so as not to prove to be a hindrance to the roll handling operation. It is to be noted that means for moving the roll handling side heads to such out-of-the way position may take any other form and is not limited to the foregoing embodiment.

In the above construction, the heads 5b are maintained at the position 50 during roll handling operation and at the solid-line position during machining operation. During machining, the roll 1 is rotated by the driving unit 4 at a constant speed, and discharge energy is supplied from the pulse sources 14a, 14b to the electrodes 10a, 10b for producing an electrical discharge. The heads 5a, 5b are moved by longitudinal feed units 7a, 7b as shown by the arrow marks 20a, 20b with a certain relation to the rotational speed of the roll 1. In this manner, a satin finish is provided to the surface of the roll 1 in the form of spirally extending continuous discharge marks. The working time may be halved because the number of the electrodes 10a, 10b is twice the number of electrodes such as 10a in the conventional device.

What is claimed is:

1. A device for electrical discharge machining of a work in the form of a roll comprising:
    a rotary shaft for supporting and rotating the work;
    a first row of electrodes mounted opposite to the roll and on one side of said rotary shaft;
    first means for holding said first row of electrodes and moving it axially of said rotary shaft;
    a first pulse source for supplying pulsed voltage across said first row of electrodes and said roll;
    a second row of electrodes mounted opposite to said roll and on the other side of said rotary shaft of said first row of electrodes;
    second means for holding said second row of electrodes and moving it axially of said rotary shaft to a position that does not obstruct the roll handing operation independently of the movement of the first row of electrodes caused by said first means; and
    a second pulse source for supplying pulsed voltage across said second row of electrodes and said roll.

2. The device as claimed in claim 1 wherein said other side of said rotary shaft is the transport side of said roll, and said second row of electrodes is mounted on the roll transport side.

3. The device as claimed in claim 2 wherein said second row of electrodes is mounted on heads which are designed to be movable in their entirety.

4. The device as claimed in claim 2 characterized in that said second means includes a second shaft for moving said second row of electrodes during said electrical discharge machining, said second row of electrodes being mounted on heads which are connected to said second shaft, said seond means including a shaft extension, said second row of electrodes and the heads associated therewith being movable together along said extension of the shaft.

5. The device as claimed in claim 4 characterized in that said extension is substantially twice as long as the rotary shaft.

6. The device as claimed in claim 1 characterized in that said second row of electrodes is mounted opposite to said first row of electrodes and both span substantially the axial length of the roll.

7. the device as claimed in claim 6 characterized in that each electrode of said second row is formed as insulated multi-divided electrode.

8. The device as claimed in claim 7 characterized in that servo means is provided for separately moving each electrode segment of the multi-divided electrode towards and away from the roll.

* * * * *